United States Patent [19]
Atzberger

[11] 3,745,661
[45] July 17, 1973

[54] BRAKE GAUGE FOR MEASURING BRAKE DRUMS AND BRAKE DISC ROTORS

[76] Inventor: Frank Atzberger, 97-26 Sutphin Blvd., Jamaica, N.Y.

[22] Filed: May 4, 1970

[21] Appl. No.: 34,049

[52] U.S. Cl. .............................................. 33/147 J
[51] Int. Cl. ........................... G01b 5/02, G01b 5/12
[58] Field of Search ..................... 33/147 R, 147 G, 33/147 H, 147 I, 147 J, 147 K, 147 M, 143 M, 143 J, 143 K, 158, 159, 160, 167

[56] References Cited
UNITED STATES PATENTS

| | | | |
|---|---|---|---|
| 1,288,034 | 12/1918 | Kirchner | 33/147 J |
| 3,507,048 | 4/1970 | Owens | 33/147 R |
| 353,561 | 11/1886 | Hurst | 33/147 J |
| 2,741,848 | 4/1956 | Livingston | 33/147 G |
| 3,114,206 | 12/1963 | Eckert | 33/167 |
| 1,478,954 | 12/1923 | Hardaker | 33/147 J |
| 1,668,248 | 5/1928 | Olson | 33/167 |

FOREIGN PATENTS OR APPLICATIONS

| | | | |
|---|---|---|---|
| 779,246 | 7/1957 | Great Britain | 33/147 J |

*Primary Examiner*—Louis R. Prince
*Assistant Examiner*—Jon W. Henry
*Attorney*—Ernest G. Montague

[57] ABSTRACT

A brake gauge for measuring the internal diameter of brake drums, as well as the thickness of brake disc rotors, selectively, comprising a longitudinal bar having a plurality of spaced openings along one end of the bar, the openings being marked corresponding to the various sizes of the internal diameter of the brake drum to be measured, a removable gauge arm selectively positioned on the bar and extending therefrom and having means for engaging in one of the openings, and a first contact point at the free end of the arm for engaging a brake drum to be measured. A fine adjustment gauge arm is positioned on the bar spaced from the removable gauge arm and includes a second contact point pointing in a direction opposite to the pointing of the first contact point. The fine adjustment gauge arm includes a fine gauging means. The bar includes a plurality of closely spaced recesses formed at the other end thereof corresponding to various thicknesses of brake disc rotors to be measured, and the removable gauge arm is adapted to be selectively positioned on this other end for engagement in one of the recesses, so that the first contact point faces toward the second contact point for measuring therebetween the thickness of a brake disc rotor.

10 Claims, 7 Drawing Figures

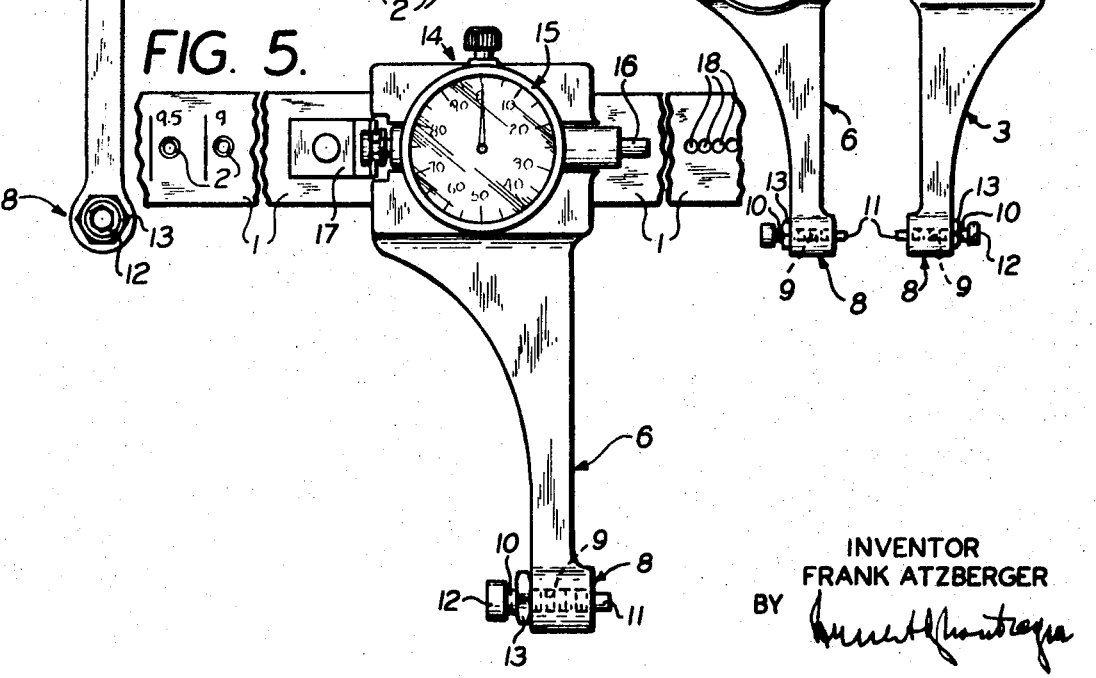

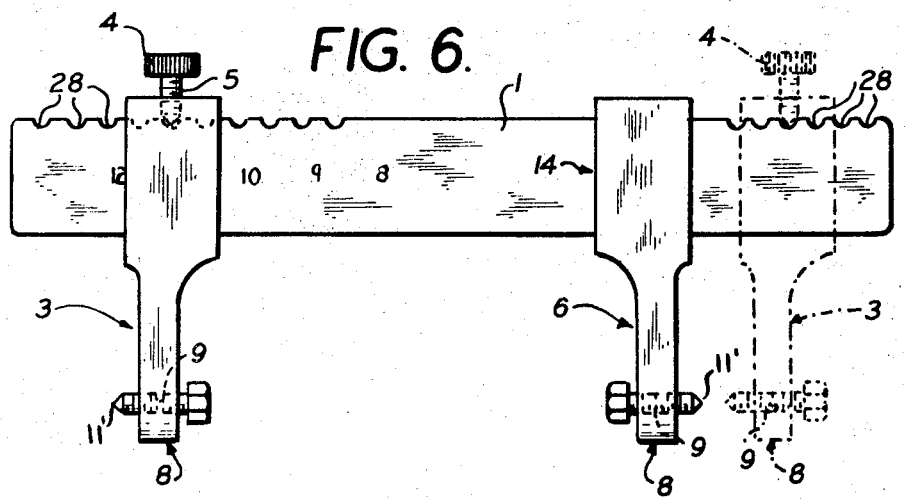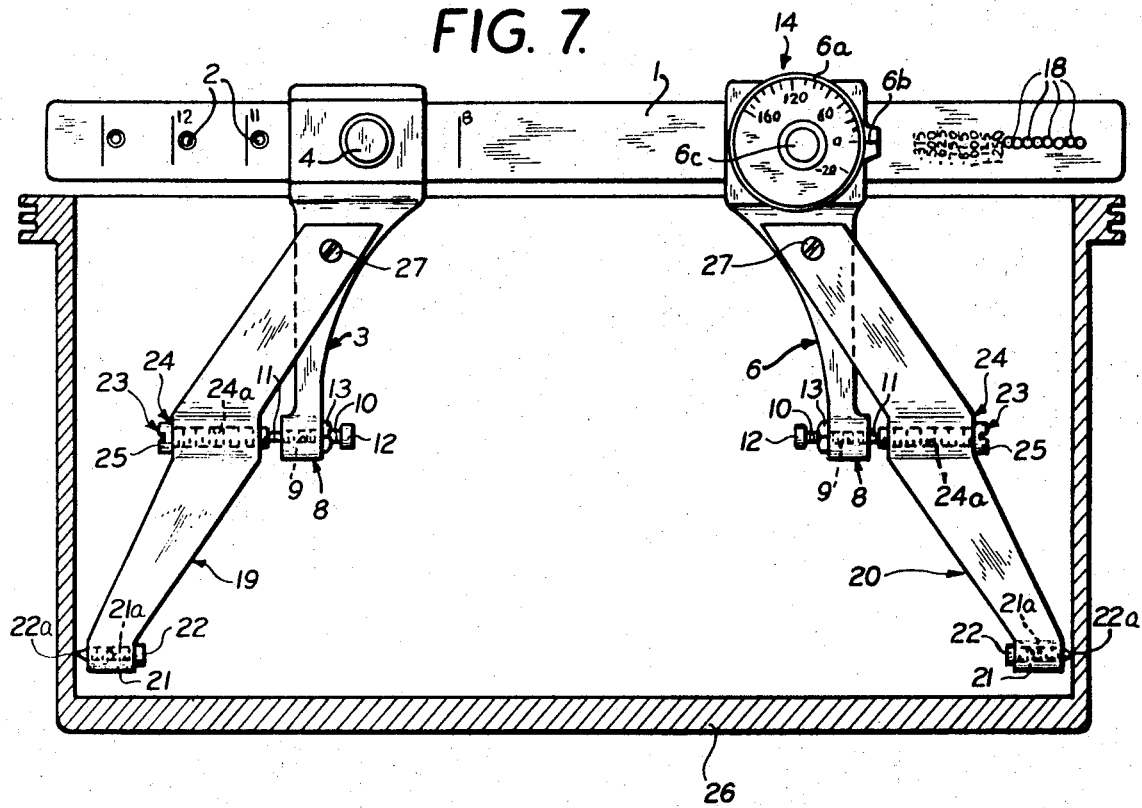

BRAKE GAUGE FOR MEASURING BRAKE DRUMS AND BRAKE DISC ROTORS

The present invention relates to a gauge, in general, and to a gauge for use in measuring brake drums and brake disc rotors.

Automobile brakes are, for the most part, of the internal expanding shoe type wherein a plurality of arcuate brake shoes are normally held in inactive position closely spaced within the internal cylindrical brake surface of a brake drum attached to the wheel of the vehicle. Braking effect is achieved upon the brake drum by a brake operating mechanism which is effective to force the brake shoe into frictional engagement with the braking surface of the drum. In order to keep the braking system in proper operating condition, it is necessary to maintain definite clearance between the frictional surfaces of the linings on the brake shoes and the braking surfaces of the drum, which clearances should not vary in the life of the vehicle. Since, however, both the brake linings and the drums are subject to wear in normal usage, it becomes necessary to provide an adjusting mechanism to move the brake shoes outwardly from time to time as the clearance increases due to such wear. When the linings become worn thin after repeated adjustment, they are replaced by new linings, which require again adjusting of the brake shoes inwardly to provide sufficient space for the increased thickness of the new lining within the brake drum. Also, it may be necessary, on the other hand, after long periods of use, to turn down the brake drum at a lathe or other suitable machine to restore the inner surface of the brake drum to a true, smooth, cylindrical shape. This reshaping of the inner surface becomes particularly necessary since the long time wear of the brake shoes on the inner surface of the brake drum bring about bellmouth wear, the degree of which cannot be easily determined. Thus, when the linings are replaced, or when the drum is worked down to a slightly larger inside diameter, it becomes even more important to obtain an accurate adjustment of the brake shoes, so that they will fit and operate properly under the new conditions.

Brake disc rotors are also frequently used on vehicles in connection with disc brakes. Brake pads cooperate with such brake disc rotors upon actuation of the latter to frictionally engage the brake disc rotor laterally to effect braking of the vehicle, the brake disc rotor being secured to the wheel. In order to keep the braking system in proper operating condition, it is necessary to maintain a smooth surface on the brake disc rotor. Frequently, the brake disc rotor must be recut, after it has been subjected to considerable wear. Since the surface of the brake disc rotor, against which the brake pads are to engage, must be smooth after cutting, it becomes important to obtain an accurate measurement of the thickness of the brake rotor in order to determine if the rotor is now in satisfactory operative condition for use again. Further, such a measurement is required to check the suitability of brake disc rotors at other times.

In order to meet the above-mentioned measurement requirements, gauges of rather complicated structure have been proposed and, additionally, in order to measure the diameter of brake drums, a separate instrument was required than for the measurement of the thickness of brake disc rotors. This led to the necessity of having two different gauge instruments, one for measuring the inner diameter of brake drums and the other for measuring the thickness of brake disc rotors, which is relatively expensive.

It is an object of the present invention to provide a single brake gauge which permits of easy determination up to thousandths of an inch on the inner surface of the brake drum of the diameter thereof by a simple instrument, as well as, the same instrument selectively permitting of easy determination up to thousandths of an inch of the brake disc rotors.

It is another object of the present invention to provide a brake gauge for measuring the internal diameter of brake drums, as well as the thickness of brake disc rotors, selectively, comprising a longitudinal bar having a plurality of spaced openings along one end of the bar, the openings being marked corresponding to the various sizes of the internal diameter of the brake drum to be measured, a removable gauge arm selectively positioned on the bar extending therefrom and having means for engaging in one of the bores and a first contact point at the end of the arm for engaging a brake drum to be measured. A second gauge arm is positioned substantially fixed on the bar spaced from the first-mentioned gauge arm and includes a second contact point pointing in a direction opposite to the pointing of the first contact point. The second arm includes a fine gauging means slidably movable for fine measurement. The bar includes a plurality of closely spaced recesses formed at the other end thereof corresponding to various thicknesses of brake disc rotors to be measured, and the first arm is adapted to be selectively positioned on the other end for engagement in one of the recesses, so that the first contact point points toward the second contact point for measuring therebetween the thickness of a brake disc rotor.

With these and other objects in view, which will become apparent in the following detailed description, the present invention will be clearly understood in connection with the accompanying drawings, in which:

FIG. 1 is a front elevation of a gauge positioned for use to measure brake drums;

FIG. 2 is a section along the lines 2 — 2 of FIG. 1;

FIG. 3 is a rear view of the removable gauge arm of FIG. 1;

FIG. 4 is a front elevation of the gauge instrument of FIG. 1, but selectively adjusted for use for measuring the thickness of brake disc rotors;

FIG. 5 is a front elevation of another embodiment of the present invention partially broken away for clarity of illustration;

FIG. 6 is a front elevation of still another embodiment of the present invention with the fine adjustment gauge arm partly broken away; and FIG. 7 shows an elevation view of yet another embodiment of the present invention.

Referring now to the drawings, and more particularly to FIGS. 1 – 3, a brake gauge designed in accordance with the present invention comprises a rigid longitudinal bar 1, preferably rectangular in cross-section and having a plurality of bores 2 therethrough, each corresponding to a diameter of a drum to be measured, e.g., 9 for a 9 inch drum, 9.5 for a 9.5 inch drum, 10 for a 10 inch drum, etc. A removable gauge arm 3 adjustably positionable on the rigid bar 1 is provided and includes a turning knob 4 integrally secured to a set screw 5, the latter being disposed in a complementary threaded bore 5a in the slidable gauge arm 3 so that the end 5b of the set screw 5 can selectively engage in one of the bores 2 on the bar 1, thereby securing the gauge arm 3 at the proper selected diameter corresponding to the internal diameter of the brake drum to be measured.

Spaced from the gauge arm 3 there is provided a fine adjustment gauge arm 6 on the longitudinal bar 1.

Both gauge arms 3 and 6 are substantially identically formed with flanges 7 complementarily overlapping the longitudinal bar 1 for positioning thereon. The gauge arms 3 and 6 extend substantially perpendicularly from the bar 1 and at their free extreme ends each form a cylindrical portion 8 having an axially threaded bore 9 therethrough extending parallel to the longitudinal bar 1. A threaded screw 10 is inserted completely through each threaded bore 9 constituting a contact point 11 beyond the cylindrical portion 8 for engaging the brake surfaces to be measured by the gauge in accordance with the present invention. The threaded screw 10 has a head 12 on its end opposite the point 11, and a nut 13 is disposed on the threaded screw 10 between the head 12 and the cylindrical portion 8 for holding the threaded screw securely in place in the cylindrical portion 8. The screws 10 may be adjusted in the bores 9 if required and then locked in position by the nuts 13.

In the position disclosed in FIG. 1, the threaded screws 10 have their contact points 11 facing away from one another so that the gauge may be used to measure the internal diameter of a brake drum in which the points 11 are to be positioned.

The gauge arm 6 is provided with a fine adjustment means 14, which may be in respects similar to that disclosed in my U.S. Pat. No. 2,972,192, dated Feb. 21, 1961.

An eccentrically mounted dial disc 6a is provided on the gauge arm 6. The top face of the dial disc 6a is equipped with a scale comprising a number of markings for reading of thousandths of an inch of diameter differences in the brake drum, preferably carrying indicia from −0.020 of an inch through +0.160 of an inch, though it is clear that any other indicia arrangement may be provided for indication of the clearance distance in the brake drum. The small bores 2, and recesses 18 at the other end of the bar which are disposed along the longitudinal axis of the bar 1 at predetermined distances, are set in such a manner that upon setting the dial disc 6a to zero position by turning the dial disc until the zero index coincides with the mark 6b on the top face of the arm 6 adjacent to the dial disc 6a, when the gauge is in the position of FIGS. 1–3, the distance between the contact points 11 amounts to 8 inches, 10 inches, 12 inches, and so forth, in accordance with the clearances of conventional brake drums, or selectively, when the removable gauge arm 3 is removed and replaced in the position of FIG. 4, the distance between the facing contact points 11 amounts to 0.375 inches, 0.500 inches, 0.625 inches, etc.

When the dial disc 6a is rotated about its longitudinal axis, the arm 6 will shift along the bar 1 slightly correspondingly to the thousandths of an inch markings on the scale on the disc 6a, and the different distances thus measured by the measuring disc 6a may be designated by the indicia on the scale therein in terms of thousandths of an inch clearance within any brake drum or disc rotor of standard size.

If the clearance of a particular brake drum is to be determined, it is merely necessary to loosen the set screw 5 of the gauge arm 3 constituting an abutment piece and to move the latter along the rod 1 to a position opposite the corresponding small bore which is set corresponding with the known diameter of the brake drum and contact points 11 are then inserted into a brake drum. In case the clearance of the brake drum is undersized, it may be necessary to set the dial into a minus position, for which purpose the dial permits to go up to −0.020. Turning of the disc 6a causes slight correspondingly fine movements of the gauge arm 6 on the bar 1.

The gauge arm 6 is mounted on the longitudinal bar 1 through an opening 6d in which is disposed the eccentrically mounted shaft 6c of the fine adjustment disc 6a so as to provide this limited corresponding movement of the gauge arm 6 during measurement. The other gauge arm 3, once positioned remains fixed in place during a measurement.

Referring now again to the drawings and more particularly to FIG. 5, alternately, as another fine adjustment means, a dial meter 15 may be provided for the fine adjustment of the gauge arm 6 which includes a rod 16 operatively connected to the meter 15 and held by a bracket 17, the latter being secured to the longitudinal bar 1. A limited displacement movement of the guide arm 6 occurring during a measurement of a brake, causes a displacement along the rod 16 which in turn causes a corresponding reading by the dial meter 15 of the extent of the displacement.

Selectively, in accordance with the present invention when it is desired to measure the thickness of a brake disc rotor, the removable gauge arm 3 is released by the set screw 5 and slidably removed from the longitudinal bar 1 and positioned on the other end of the bar 1 such that its contact point 11 now faces the contact point 11 of the screw 10 of the fine adjustment gauge arm 6 for measuring therebetween the thickness of a brake disc rotor, as indicated in FIG. 4.

A plurality of closely spaced recesses 18 are formed on this end of the bar 1 corresponding to the nominal sizes of the thicknesses of different brake disc rotors to be measured. The bar 1 is likewise marked with the numerical values corresponding to the recesses 18 on this end of the bar, and particularly, although not limited thereto, range from 0.375 to 1.250 of an inch. The end 5b of the set screw 5 is formed as a conical point so as to be able selectively to engage in any of these recesses, which are substantially smaller than the bores 2 due to the closeness of their spacing, the point of the screw 5 being sufficient to hold the gauge arm 3 in position in a selected recess 18 upon turning of the knob 4 on the gauge arm 3.

Referring now to the drawings and more particularly to FIG. 6, a gauge in accordance with the present invention may instead of the front bores 2 and recesses 18 of FIGS. 1–4 comprise notches 28 at the top of the rod 1, for fixing selectively the gauge arm 3 in position on the bar 1. In this embodiment, the set screw 5 for positioning the gauge arm 3 is disposed vertically at the top of the gauge arm 3.

The contact points 11' may be conically pointed as indicated in FIG. 6.

Referring now to the drawings and more particularly to FIG. 7, another embodiment of the device of the present invention is disclosed with like numerals representing previously described features. Pivotally fastened to the guide arms 3 and 6 are extension arms 19 and 20 which are adapted to be oriented in the position shown in FIG. 7 for measuring deep drums and having a large diameter, as indicated therein, in which the gauge is shown in position for measuring, for example, a truck drum 26. The extension arms 19 and 20 are formed with cylindrical portions 21 at their free ends, respectively, which have a threaded bore 21a in which a threaded, pointed contact screw 22 extends similar to the contact screws 10 previously described. The contact screws 22 have contact points 22a pointing away from one another as illustrated in FIG. 7 for engaging the internal diameter of the truck drum to be measured.

The extension arms 19 and 20, in the extended position are disposed approximately 30° from the vertical, symmetrically away from one another, although not limited thereto, the exact position being determined by adjusting screws 23 disposed through a threaded bore 24a in a central cylindrical portion 24 of the extension arms 19 and 20. The free ends of the adjustment screws 23 pressingly abut the contact points 11 of the arms 3 and 6, respectively, during a measuring of the internal diameter of a large brake drum and have a screw head 25 for adjusting the axial position of the screw 23 therein against the contact points 11 thereby determining the exact angular disposition of the extension arms 19 and 20 against the contact points 11.

The extension arms 19 and 20 are fastened preferably by screws 27 to the arms 3 and 6, and may be removable, or pivotally turned upwardly out of the measuring range so that the contact points 11 may be used for measuring smaller brake drums and disc rotors, selectively.

The contact points therein constitute feeler tips.

The fine gauging means represents any apparatus know to a skilled mechanic for translational sliding motion of the fine adjustment gauge arm relative to the bar with corresponding rotatable motion of the dial through a large angle.

While I have disclosed several embodiments of the present invention, it is to be understood that these embodiments are given by example only and not in a limiting sense.

I claim:

1. A brake gauge for measuring the internal diameter of brake drums, as well as the thickness of brake disc rotors, selectively, comprising
    a rigid longitudinal bar having a plurality of first recesses spaced from each other along one end of said bar, said first recesses being marked corresponding to various sizes of the internal diameter of a brake drum to be measured,
    a removable gauge arm selectively displaceably positioned on said bar and extending therefrom to a free end and including thereat a first feeler tip constituting a first contact tip,
    said removable gauge arm including means for releasably securing said gauge arm on said bar in predetermined fixed relation to one of said first recesses, selectively, and constituting a first coarse cooperative adjustment position,
    a fine adjustment gauge arm displaceably disposed on said bar spaced from said removable gauge arm and including a fine gauging means for reading a fine displacement of said fine adjustment gauge arm along said bar,
    a plurality of closely spaced second recesses formed at the other end of said bar corresponding to and marked according to various thicknesses of brake disc rotors to be measured and of a spacing closer than that of said first recesses,
    said fine adjustment gauge arm extending from said bar to a free end and including thereat a second feeler tip constituting a second contact tip spaced from said first feeler tip, said first feeler tip pointing away from said second feeler tip in said first position, and
    said removable gauge arm being removable from said one end of said bar adjacent said first recesses and positionable on said other end of said bar adjacent said second recesses and constituting thereat a second position, said means for releasably securing said removable gauge arm further constituting means for cooperating with one of said second recesses, selectively, to securely, but releasably fix said removable gauge arm on said other end of said bar at a position corresponding to the thickness of a brake disc rotor to be measured, said first and second feeler tips in said second position pointing toward each other.

2. The brake gauge, as set forth in claim 1, wherein said gauge arms each have two rear flanges engaging the rear of said bar and defining a slot complementary to the cross-section of said bar and oriented so that said gauge arms extend substantially perpendicularly therefrom to said free ends.

3. The brake gauge, as set forth in claim 1, wherein said fine gauging means includes a dial meter means and a rod secured to said bar and cooperating with said dial meter means for cooperating with said rod to provide an indication on said meter means of the amount of displacement of said fine adjustment gauge arm relative to said rod.

4. The brake gauge, as set forth in claim 1, wherein said bar is rectangular in cross-section, and
    said first recesses comprise a plurality of holes through said bar and longitudinally spaced from each other.

5. The brake gauge, as set forth in claim 1, wherein said releasable securing means comprises a set screw, a threaded bore formed in said removable gauge arm in which said set screw is adjustably disposed, and
    said set screw having an end which is engageable in said first recesses and said second recesses, selectively.

6. The brake gauge, as set forth in claim 5, wherein said first recesses are larger than said second recesses, and
    said end of said set screw forms a conical point.

7. The brake gauge, as set forth in claim 1, wherein said first and second recesses comprise notches on one edge of said bar.

8. The brake gauge, as set forth in claim 1, wherein said free ends of said gauge arms are formed into a cylindrical portion having a threaded bore therethrough extending parallel to said bar, and
    a contact screw adjustably positioned fixedly in each of said threaded bore and each having a point extending therefrom, the latter constituting said feeler tips.

9. The brake gauge, as set forth in claim 1, further comprising
    two extension arms, each fastened to each of said gauge arms, respectively, adjacent said bar and extending beyond said contact point ends of said gauge arms, respectively, and away from said bar to extension arm free ends and forming thereat a third and fourth feeler tips respectively, facing away from each other, in said first position of said gauge arms, said extension arms each including an intermediate portion having a threaded opening facing said first and second feeler tips, respectively, an adjustment screw disposed in each of said threaded openings and abutting said first and second feeler tips for adjustment of an angle of extension of said extension arms, said extension arms being pivotally connected to said gauge arms, respectively.

10. The brake gauge, as set forth in claim 9, wherein said extension arms extend angularly away from each other and angularly relatively to said bar other than 90°, said extension arm free ends each are cylindrical in shape and include a threaded bore extending parallel to said bar, and a contact screw disposed in each of said threaded bores and having an end thereof extending therefrom constituting said third and fourth feeler tips.

* * * * *